United States Patent [19]

Dowd et al.

[11] Patent Number: 5,105,521

[45] Date of Patent: Apr. 21, 1992

[54] METHOD OF ASSEMBLING MODULAR HEADLINER TO A VEHICLE BY SNAP-FITTING

[75] Inventors: James D. Dowd, Farmington Hills; David M. Hilborn, Sterling Heights; Matthew J. Brown, Rochester Hills; Richard P. Bozyk, Roseville, all of Mich.

[73] Assignee: United Technologies Automotive, Inc., Dearborn, Mich.

[21] Appl. No.: 566,016

[22] Filed: Aug. 10, 1990

Related U.S. Application Data

[62] Division of Ser. No. 204,662, Jun. 10, 1988, Pat. No. 4,981,323.

[51] Int. Cl.$^5$ .............................................. B23P 11/02
[52] U.S. Cl. ..................................... 29/453; 29/401.1; 29/413; 296/214
[58] Field of Search ...................... 29/401.1, 418, 450, 29/453, 521, 525.2, 413; 296/37.7, 37.8, 97.13, 214

[56] References Cited

U.S. PATENT DOCUMENTS

| 2,550,323 | 4/1951 | Bishop | 296/214 X |
| 4,390,203 | 6/1983 | Lutz et al. | 296/214 X |
| 4,595,230 | 6/1986 | Fettes | 29/401.1 X |
| 4,650,244 | 3/1987 | Boots | 296/214 X |
| 4,664,440 | 5/1987 | Kano et al. | 296/214 |
| 4,978,161 | 12/1990 | Schulze | 29/401.1 X |

FOREIGN PATENT DOCUMENTS

| 88931 | 9/1983 | European Pat. Off. | 296/214 |
| 2491841 | 4/1982 | France | 296/214 |

Primary Examiner—Joseph M. Gorski
Assistant Examiner—Peter Dungba Vo
Attorney, Agent, or Firm—Christopher T. Hayes

[57] ABSTRACT

A modular headliner includes an assist strap for mounting to the modular headliner to the vehicle body structure and includes an assist strap fastening means. The fastening means extends to engage a vehicle body adjacent an opening defined by a vehicle body structure. A mandrel may then be inserted between the fastening means to lock the fastening means to the vehicle body structure to thereby mount the assist strap and headliner to vehicle body structure.

The assist strap may include a pivotally mounted handle having a preassembly position such that upon displacement of the handle, the mandrel is displaced to the locking position. Additionally a breakaway tab means may secure the handle to the assist strap base such that until sufficient force is applied to the handle to rupture the breakaway tab the handle will not be displaced. The tab is tuned to require that a sufficient force be sufficient to drive the mandrel to the locking position.

4 Claims, 5 Drawing Sheets

METHOD OF ASSEMBLING MODULAR HEADLINER TO A VEHICLE BY SNAP-FITTING

This is a division of copending application Ser. No. 07/204,662, filed on June 10, 1988, now U.S. Pat. No. 4,981,323.

CROSS REFERENCE TO RELATED APPLICATIONS

This application relates to the following simultaneously filed patent applications: U.S. application Ser. No. 204,804, now U.S. Pat. No. 4,913,484, for HEADLINER AND SUNSHADE FASTENER by James D. Dowd, David M. Hilborn, Roy Weilant and Abdolhossein R. Lawassani; U.S. application Ser. No. 204,663, now U.S. Pat. No. 4,893,866, for MOTOR VEHICLE BODY STRUCTURE FOR RECEIVING SNAP-FIT MODULAR HEADLINER FASTENERS by James D. Dowd and David M. Hilborn; U.S. application Ser. No. 205,139, now U.S. Pat. No. 4,902,068, for MODULAR HEADLINER ASSEMBLY by James D. Dowd and Darrel Hampton; U.S. application Ser. No. 205,257, for SUNSHADE WITH SNAP-FIT FASTENER by James D. Dowd, David M. Hilborn, Roy Weilant and Abdolhossein R. Lawassani; U.S. application Ser. No. 204,670, for ASSIST STRAP FOR A MOTOR VEHICLE by James D. Dowd, David M. Hilborn, and Matthew J. Brown; U.S. application Ser. No. 205,150, for SUNSHADE FASTENER MODULE FOR USE WITH MODULAR HEADLINER by James D. Dowd, David M. Hilborn, Roy Weilant, and Abdolhossein R. Lawassani; U.S. application Ser. No. 205,130, now U.S. Pat. No. 4,844,533, for FRONT LAMP MODULE AND SUNSHADE SUPPORTS FOR MODULAR HEADLINER by James D. Dowd, David M. Hilborn, Roy Weilant, and Abdolhossein R. Lawassani; U.S. application Ser. No. 205,265, now U.S. Pat. No. 4,893,867, for CONSOLE MOUNTED TO A HEADLINER by David M. Hilborn and Stephen P. McGarry; U.S. application Ser. No. 205,131, now abandoned, for MODULAR HEADLINER INCLUDING A WIRE HARNESS James D. Dowd, Darrel Hampton, and Stephen P. McGarry.

1. Technical Field

This invention relates to a modular headliner including an assist strap which may be mounted to the motor vehicle body structure. The assist strap acts as a grab handle and as means for securing the headliner to the vehicle body structure.

2. Background of the Invention

Motor vehicle headliners have been mounted to the body structure of a vehicle in a series of individual steps on a vehicle assembly line. Several steps are involved in installing a headliner substrate and various accessory components to the substrate, and to the vehicle, to hold the substrate in position. This type of assembly requires numerous assembly stations and numerous assembly operators to complete.

The herein invention is concerned with a modular headliner which is assembled as a unitary element to a motor vehicle at a single assembly station. Additionally the herein described modular headliner is designed to be assembled to the vehicle body and specifically to the vehicle body structure by being snap-fit to the vehicle body structure such that the operator need not enter the vehicle to mount the modular headliner thereto.

A portion of the modular headliner is secured to the vehicle body structure by an assist strap preferably positioned along the side of the modular headliner towards the rear and positioned such that upon assembly the headliner to the vehicle the assist strap will be in a position such that the user or occupant of the vehicle as they enter or leave through the vehicle door may use the assist strap act as a grab handle for providing assistance as they enter or exit through the door or under adverse driving conditions.

The assist strap as described herein includes a base and at least one set of projecting legs which extend through the substrate and through an opening in the vehicle body structure to engage the vehicle body structure on the opposite side such that the substrate and vehicle body structure are secured between the legs and the base of the assist strap. In most assist straps at least two sets of legs will be utilized to promote further securing of the assist strap and the attached headliner to the vehicle body structure. Additional sets of projecting legs may be used as appropriate.

The assist strap acts to lock the headliner to the vehicle body structure by the provision of a mandrel having a first position which allows the projecting legs of the assist strap to be flexed such that the legs may be compressed together for insertion through the opening of the vehicle body structure and a second position wherein the mandrel is placed between the legs such that the legs may not be compressed thereby locking the legs with a portion of the legs extending behind the vehicle body structure to engage the opposite side of the vehicle body structure from the substrate to sandwich the substrate between the vehicle body structure and the assist strap base. In this manner the legs of the assist strap are locked to the vehicle body structure and the headliner is mounted in position.

To make the assembly of the modular headliner to the vehicle body structure even easier the assist strap is designed to have a pivotally mounted handle positioned, such that upon the application of force to the handle, the handle will be displaced driving the mandrel from the first position to the second position. The handle includes a smooth surface such that there is very little friction between the handle and the mandrel as it is driven from first position to second position and the handle is appropriately arranged such that upon pivotal displacement of the handle, the force is applied in a direction parallel to the axis of the mandrel to drive the mandrel in an axial sliding motion as opposed to applying a twisting force thereto.

In order to assure that sufficient force is applied to the handle to drive the mandrel from the first position to the second position a breakaway tab is utilized to secure the handle in a preassembled position. A spring biases the handle to an upright position, however the handle is maintained in a fixed position by breakaway tab prior to assembly. The breakaway tab is sized such that upon the application of sufficient force to break the tab, the force will be sufficient to drive the mandrel from the first position to the second position. The size of the breakaway tab is selected to tune the force such that the minimum force required to break the tab is sufficient to drive the mandrel completely to the second position.

The assist strap for use with the modular headliner further includes a retainer clip for engaging the fastening means of the assist strap and potentially other portions of the assist strap on the side of the substrate opposite from the base of the assist strap such that the substrate is secured therebetween and the assist strap is mounted to the substrate prior to the modular headliner being mounted to the vehicle body structure. In this manner the assist strap is maintained in position as a portion of the modular headliner prior to the assembly of the modular headliner to the vehicle body structure.

The use of an assist strap having a "smack set handle" as described herein allows the installer to simply smack the handle to drive the mandrel to the home position and is compatible with the entire assembly of the modular headliner to the motor vehicle with snap-in fasteners. As the installer is fastening the modular headliner to the vehicle the installer will feel the fastening means pass through the vehicle body structure opening when the legs then snap outwardly. Once he feels this engagement he knows that upon smacking the assist strap handle with his hand, he will, if the smack is of sufficient force to rupture the breakaway tab, cause the handle to engage the mandrel and drive the mandrel from the first position to the second position to lock the assist strap and consequently the headliner to the vehicle body structure.

The mandrel is sized to extend from the assist strap base outwardly towards the handle in the preassembled position. The mandrel includes a larger diameter head and a smaller diameter base. The assist strap base defines a larger diameter opening for receipt of the mandrel head and a smaller diameter opening extending therethrough through which the base of the mandrel may pass. Upon the mandrel being displaced to the second position, the head of the mandrel is contained within the larger opening in the assist strap base such that assist strap base presents a pleasing final appearance to observers within the vehicle.

The method of mounting the assist strap and retainer for securing the assist strap to the headliner prior to assembly of the headliner to the vehicle body may be utilized with other accessories. The other accessories may include items as part of modular headliner such as a coat hook, coat hanger, storage module, light module, console, display, sunshade support and the like.

SUMMARY OF INVENTION

It is an object of the present invention to provide a modular headliner including an assist strap secured thereto.

It is another object of the present invention to provide a modular headliner having an assist strap secured thereto and wherein the headliner is secured to the vehicle body structure by inserting fastening means extending from the assist strap through an opening of the vehicle body structure and thereafter smacking the assist strap driving a mandrel from a first position to a second position locking the fastening means to secure the headliner to the body structure.

Another object of the present invention is to provide a modular headliner with an assist strap including a pivotally mounted handle and a breakaway tab securing the handle in a desired position, said breakaway tab being tuned such that the force necessary to rupture the breakaway tab is sufficient to drive the mandrel from a first position to a second position.

Another object of the present invention is to provide a safe, economical, reliable, easy to utilize assist strap assembly for securing a modular headliner and an assist strap to a motor vehicle.

Other objects will be apparent from the description to follow and the appended claims.

The above objects are achieved according to preferred embodiment of the invention by the provision of a modular headliner having an assist strap which may be mounted to the vehicle body structure defines vehicle body openings. A headliner substrate includes a decorative covering and is configured for mounting within the interior of the vehicle adjacent the roof, said substrate defining substrate openings. An assist strap base is positioned adjacent to the decorative covering and includes a handle mounting area, and a handle being mounted to the handle mounting area of the assist strap base. Fastening means extend from the assist strap base through the substrate opening and are positioned upon assembly of the modular headliner to the vehicle to engage the vehicle body structure adjacent to the vehicle body opening. A retainer means is provided for securing the base of the assist strap to the substrate prior to assembly of the substrate to the body structure.

Further disclosed is a method of assembling a modular headliner including an assist strap to a vehicle body structure defining vehicle body openings, wherein the assist strap includes projecting fastening means and a mandrel mounted for slidable displacement to lock the fastening means in position. The method includes the steps of positioning the headliner within the vehicle body with the fastening means aligned with the vehicle body openings, displacing the headliner until the fastening means snap fits to the vehicle body structure adjacent to vehicle body openings and thereafter moving the mandrel to the position to lock the fastening means to the vehicle body structure. This method may further include smacking the handle to rupture breakaway tabs to thereafter engage the mandrel to drive it to the second position.

Additionally disclosed is a retainer for securing an accessory to a substrate, said accessory including fastening means projecting from the accessory through an opening in the substrate. The accessory includes a planar retainer body for engaging the substrate, the body defining a first opening sized to allow the fastening to pass therethrough, said body further defining as a portion of said opening a pair of spaced spring arms, said arms being sufficiently spaced to engage opposite sides of the fastening means upon displacement of the retainer and further including inwardly extending protuberances located on said spring arms. These protuberances are positioned upon assembly of the retainer to the fastening means to secure the fastening means between the protuberances and edge of the first opening.

DESCRIPTION OF THE PREFERRED EMBODIMENT

The invention will be described with reference to a specific embodiment or embodiments hereof. It is understood that this invention has applicability with minor modifications to many vehicle lines, body styles, trim levels and structures, and it is to be anticipated that various changes can be made to the disclosed embodiments within the spirit and scope of the invention.

Figures 1, 1A:
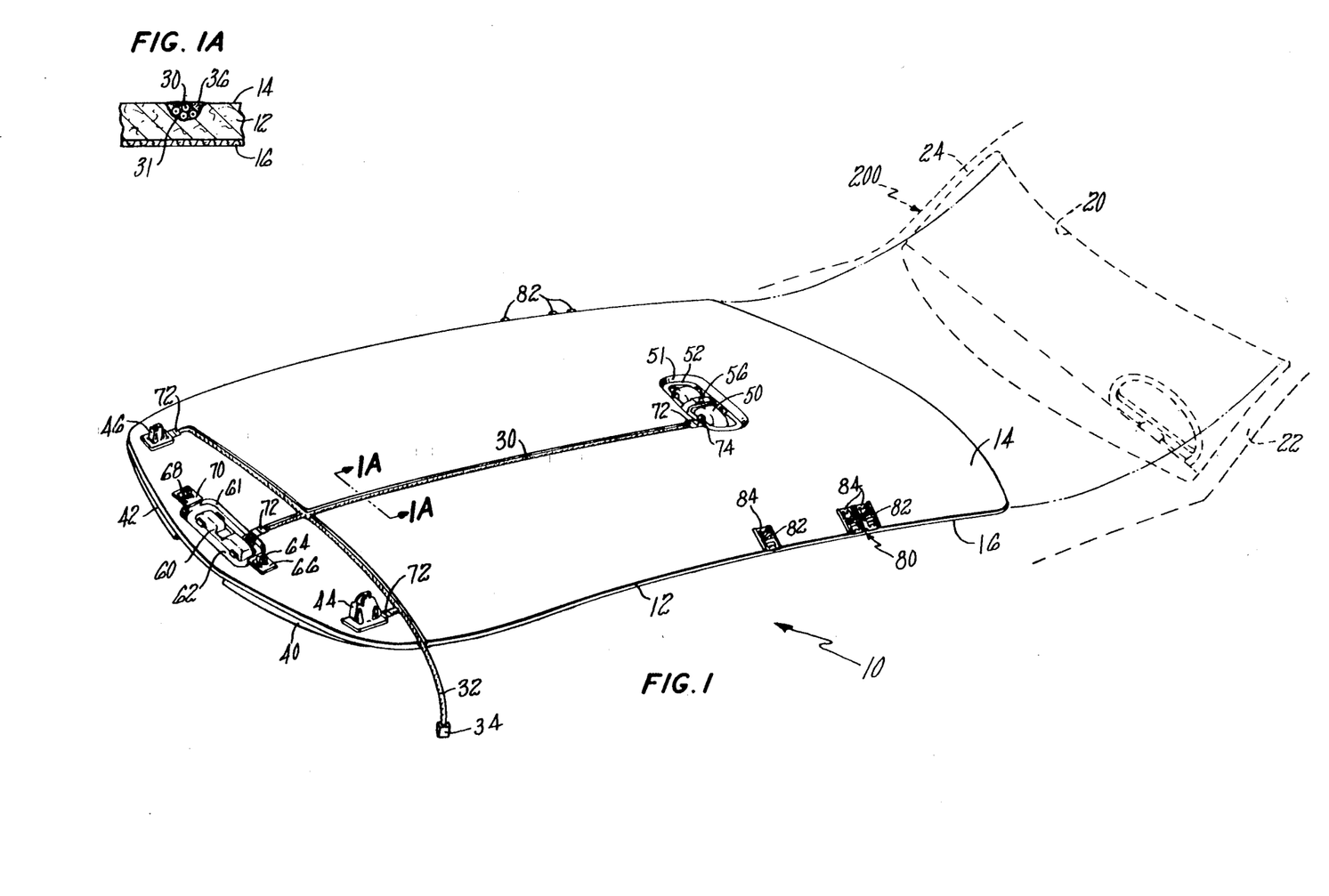
FIG. 1 is a perspective view of a modular headliner assembly positioned adjacent the vehicle windshield opening for assembly therethrough.
FIG. 1A is a perspective view of FIG. 1 taken at the indicated line.

FIG. 1 is a perspective view of a modular headliner assembly 10 about to be installed into motor vehicle 200. The motor vehicle is shown having windshield opening 20, left A-pillar 22 and right A-pillar 24. The modular headliner is mounted into the partially assembled vehicle through the windshield or other large window opening which could also be the rear window opening. In this manner, the body structure of the vehicle may be assembled prior to the modular headliner assembly being mounted thereto.

Modular headliner assembly 10 consists of all those components between the decorative interior surface of the headliner and the body structure of the vehicle. The modular headliner 10 must be appropriately configured such that when assembled, the modular headliner may be shipped, handled and installed in the vehicle and potentially mistreated during a portion of this process without having the interior surface damaged, without distortion or bending due to uneven stresses and without impacting the function of the various components thereof.

As may be specifically seen in FIGS. 1 and 1A, the headliner includes substrate 12 made from a material such as molded fiberglass, styrene, cardboard, a polymeric material, or as is otherwise as known in the art. Substrate 12 has mounted on the surface thereof a decorative covering or surface 16 which is the surface visible to an occupant of the finished vehicle. The opposite side of substrate 12 from that on which decorative surface 16 is mounted is the non-show surface, surface 14.

Left sunshade 40 and right sunshade 42 are mounted to the substrate by the use of left sunshade fastener 44 and right sunshade fastener 46.

Additionally shown as part of the modular headliner are assist straps 80 which are retained to the modular headliner by retainer clip 84 interacting with assist strap legs 82.

Also shown as a portion of modular headliner 10 is center console 50 which is shown secured within depressed portion 51 formed in the substrate to retainer 52. A mesh fastener 56 is shown located to extend upwardly from retainer 52.

Likewise, forward console 60 is shown mounted within depressed portion 61 formed in the headliner in combination with forward retainer 62. Forward retainer 62 includes an outwardly projecting area through which left inboard sunshade support 64 and right inboard sunshade support 68 extend. Appropriate retainers 66 and 70 are shown for securing the legs of the inboard sunshade supports to hold the inboard sunshade supports in position.

Further shown as part of the modular headliner is wire harness 30 having a wire bundle 32, including a vehicle electrical connector 34 and a series of accessory connectors 72 located adjacent each accessory requiring electrical connections. Complementary connectors 74 extend from each accessory and mate with accessory connectors 72 to form a completed wire harness. Vehicle electrical connector 34 is typically connected to a mating connection extending from the vehicle body electrical system in an easy to access area such as one of the A-pillars.

Additionally it may be seen that the modular headliner wire harness is secured within substrate channels 31 such that the wire is maintained therein. Additionally, adhesive 36 may be placed over the wire bundle to secure the wire bundle within the channel. In this manner, the wires are protected from inadvertent contact with roof bows or other roof structure and the potential for damage to the wires is avoided.

As may be seen in FIG. 1, the modular headliner assembly is about to be inserted into the vehicle for assembly thereto. The left and right sunshade fasteners, 44 and 46, extend upwardly and include legs for engaging with the metal structure of the vehicle to mount the same thereto. Likewise, assist straps 80 have upwardly extending legs 82 which engage appropriate openings in the body structure to also secure the modular headliner to the vehicle. Furthermore, mesh fastener 56 may appropriately interact with a corresponding mesh fastener to likewise secure the headliner to the body structure. Hence, the left and right sunshade fasteners and at least one of the two assist strap handles are used for securing the modular headliner assembly to the motor vehicle. Furthermore, the mesh fastener of retainer 52 may likewise serve such a function. Also not to be ignored are the right inboard sunshade support and the left inboard sunshade support which also includes legs for engaging the sheet metal structure of the vehicle.

In order to assemble the modular headliner to the vehicle, the headliner is slid through a large window opening such as a windshield and placed in general position to which it is to be mounted. An operator then positions one of the sunshade fasteners to feel when the fastener mates with an appropriate opening. The sunshade fastener is then snap-fit into the opening to mount that portion of the modular headliner. The same process is then followed with the other sunshade fastener, the assist straps and the inboard sunshade supports. In this manner, the entire modular headliner may be snap-fit to the motor vehicle. Thereafter, an appropriate electrical connection is made at vehicle electrical connector 34 and the assembly process for the headliner is complete.

Figure 2:
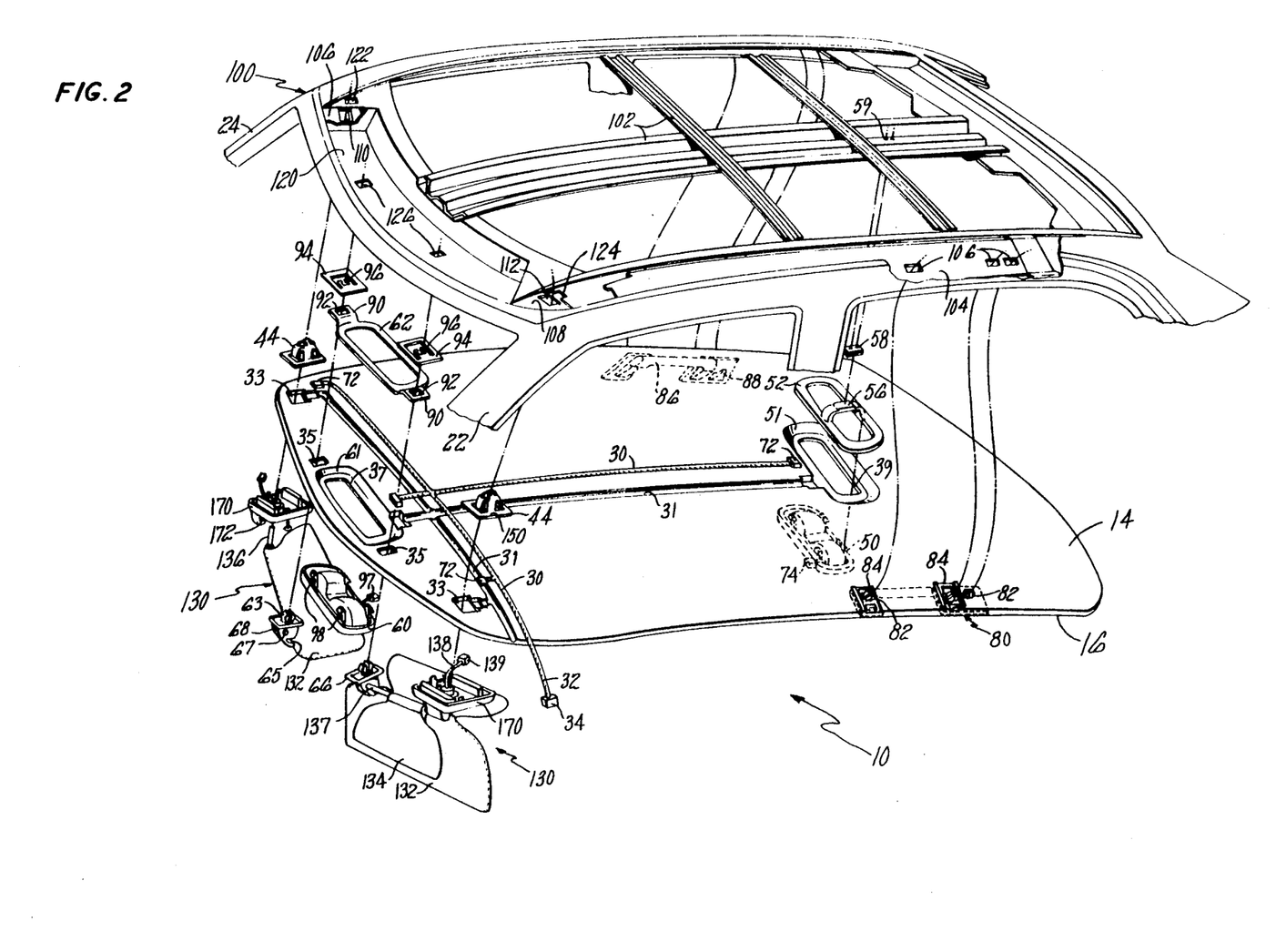
FIG. 2 is an exploded perspective view of a modular headliner assembly and appropriate portions of the vehicle body structure.

In FIG. 2 an exploded view of a modular headliner about to be mounted to a vehicle body structure is shown. In this view it may be seen that modular headliner 10 incorporates many various subassemblies such that all the appropriate subassemblies are mounted to the modular headliner and such that may be readily fastened to the vehicle body structure.

The wire harness 30 of the modular headliner assembly includes a series of accessory connectors 72 adapted to be connected to the appropriate electrical accessory mounted to the headliner. The wire harness assembly is further shown slightly exploded from channels 31 formed in the substrate for securing the headliner wire harness therein. This wire harness assembly is shown somewhat schematically and may, in fact, be located at different positions about the headliner, such positions being chosen for having optimum room for securing wires therein and for providing optimum space between the headliner and the vehicle body structure to prevent any accidental contact therebetween.

The center console 50 is shown having a complementary connector 74 extending therefrom for connection to accessory connector 72. Front console 60 has a complementary connector 97 and sunshade module 130 has a complementary connector 139, designed to be connected to accessory connectors 72 to form the integrated wire harness of the modular headliner assembly.

Center console 50 and forward console 60 are shown somewhat in schematic format. It is to be understood that these consoles may include features such as overhead lights, reading lights, displays, vanity mirrors, garage door opener compartments switches, and other control features such that a modular headliner wire harness may include a significant number of conductors. Additionally, the sunshade modules as shown are anticipated to be sunshade modules incorporating illuminated vanity mirrors which likewise require a power supply.

Center console 50 is mounted through a substrate center module opening 39 formed in depressed portion of the substrate 51 to retainer 52 mounted on the opposite side of the substrate. Retainer 52 may have extending wings which act to distribute the load of the console over a wide area of the substrate such that uneven loading or distortion during the shipping or handling process is avoided. The substrate about the console is depressed and defines an opening therein. The console covers the end of the depression including the opening to form a neat, highly attractive module.

Mesh fastener 56 attached to a back portion of the retainer or alternatively to the console is designed to interact with mesh fastener 58 secured at location 59 to the roof bows of the vehicle body structure. This mesh retainer is preferably a Dual Lock ® retainer. By the selection of Dual Lock ® material, it is possible that the headliner may slide into position with one portion of the Dual Lock fastener sliding relative to the other. The Dual Lock ® fastener has the property that it does not grab and lock until the two fasteners are forced one into the other such as when the substrate is displaced upwardly locking it into its final position. Prior to such time, the headliner and the two mesh portions may be slid relative to one another to allow positioning and alignment of the headliner. This is quite different than other mesh fasteners which grab upon contact and may not thereafter be readily displaced.

Front console 60 is shown having snap legs 98 which extend upwardly through substrate front console opening 37 formed in depressed portion 61 to engage retainer 62. Retainer 62 has wings 90 which define wing openings 92. Inboard sunshade supports 66 and 68 extend with fastening legs 63 projecting upwardly through substrate openings 35, through retainer openings 92 and are secured in position by retainers 94 including spring legs 96 and, upon final assembly, extend through header openings 126 in the vehicle body structure. Each of the inboard sunshade supports 66 and 68 includes a receptacle for secondary visor 67 and a slot for receiving primary visor 65. As is seen in reference to sunshade module 130, the module includes a primary visor 132 and a secondary visor 134. The primary visor is mounted on the pivot rod 136 and the secondary visor is mounted on the pivot rod 137. The sunshade module further includes fastener 44 having a base 170, cover 150 and wires 138 extending therebetween. The primary visor is mounted for pivoted movement with pivot rod 136 and for rotation about the pivot rod 136 between a stored position against the headliner and a downward position to shield an occupant's eyes from sunlight entering through the windshield. When the primary visor is pivoted to block the sunlight coming through the side window, then the secondary visor may be rotated downwardly to block sunlight entering in through the windshield.

Assist straps 80 include projecting legs 82 projecting through the headliner substrate. Retainer clips 84 are shown in engagement with legs 82 to secure the assist straps to the headliner. An assist strap may include handle 86 and a coat hook 85, and is mounted in an appropriate position to provide a grab handle for an occupant entering or leaving the vehicle. Assist strap openings 106 are shown defined by inside rail 104 of the vehicle body structure 100. It is to these assist strap openings 106 that legs 82 engage to hold the assist strap and consequently the modular headliner in position. Fastener 44 engages the vehicle body structure through left A-pillar opening 112 formed in left A-pillar inner 108, a portion of A-pillar 22. In the same manner, right fastener 44 is inserted through the right A-pillar opening 110 of right A-pillar inner 106, a portion of right A-pillar 24. Both fasteners are likewise mounted through header left sunshade fastener 124 and header right sunshade fastener 122 openings, both being openings in header 120.

Vehicle body structure 100 as shown includes a series of roof bows 102 and the header and A-pillars as previously mentioned. Additionally, vehicle body structure 100 includes side rail 104 defining openings 106 to which the various assist strap legs may be engaged.

Hence, it may be seen from FIG. 2 that the entire modular headliner assembly may be secured to the vehicle body structure with the vehicle body structure merely providing appropriately sized and positioned openings. No other structure need be added to the vehicle body structure to allow the modular headliner to be secured thereto. All the fasteners for securing the modular headliner are affixed to the modular headliner such that the vehicle assembler need only mount the modular headliner to the vehicle body structure and need not add any intermediate fastener or receptacle portions.

Figure 3:
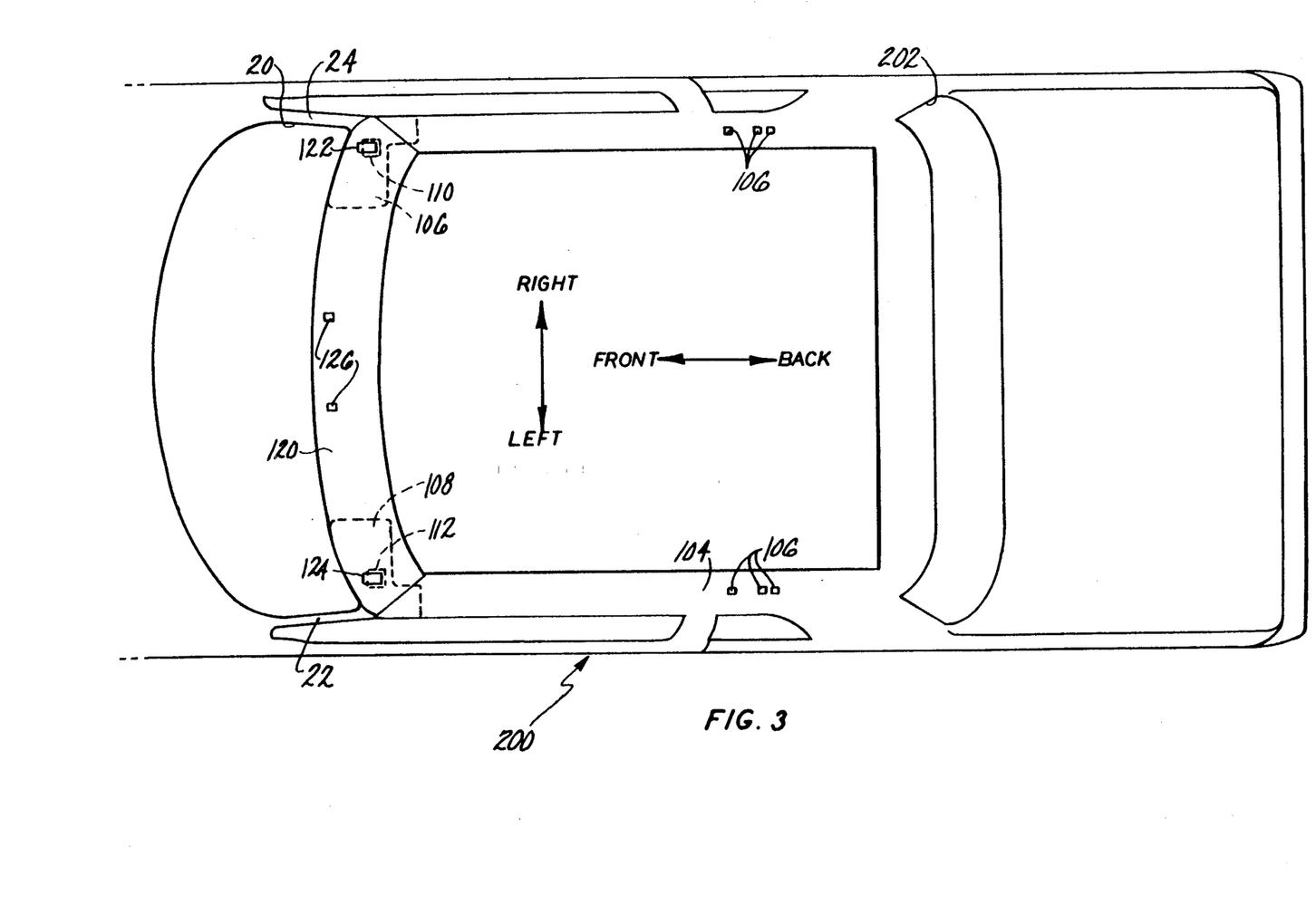
FIG. 3 is a top view of the vehicle body structure showing the mounting locations for a modular headliner.

FIG. 3 is a top view of a motor vehicle body structure. Specifically, there may be seen windshield opening 20, and rear window opening 202 of motor vehicle 200. Left A-pillar inner 108 is shown defining left A-pillar opening 112. Right A-pillar inner 106 is shown defining right A-pillar opening 110. Header 120 is shown having header openings 124, 122 and header inboard sunshade support openings 126. Additionally, side rails 104 are shown having openings 106. Additionally, various arrows are shown to indicate the left and right direction and the front and back directions relative to the vehicle.

When the modular headliner is assembled, fasteners 44 are displaced upwardly through various openings. A fastener will be displaced upwardly until the cover first engages the A-pillar inner 108. The operator will then through displacement of the angled end of cover 150 be able to feel when cover 150 enters into inner opening 112. The operator then displaces the modular headliner upwardly until the flanges pass through opening 112 and snap outwardly to engage the modular headliner to the vehicle body structure.

However, since the left A-pillar inner and the right A-pillar inner are two entirely separately distinct pieces of sheet metal which are assembled to the vehicle and are subject to manufacturing tolerances and variations, the relative positioning between the two is not always maintained constant. On the other hand, header 120 is a single stamping and contains a plurality of openings which are all fixed relative to one another. However, the header itself may not be necessarily secured to the A-pillar inners and the rest of the vehicle body structure always in the same position. Hence, the combination of openings overlapping one another, A-pillar opening 112 and header opening 124 and A-pillar opening 110 and header opening 122 are shown. In this manner, each opening acts to secure the displacement of the modular headliner in a single direction, but not the other direction whereby flexibility may be obtained in the manner in which the modular headliner is mounted. This flexibility is necessary to compensate for the various tolerance and variances during the assembly of the vehicle. In this manner, a single fastener may first be mounted to the vehicle structure and the modular headliner thereafter be pivoted to mate with the other openings while the entire modular headliner is aligned relative to the vehicle. By providing these sliding arrangements, a snap-fit fastening arrangement may be utilized to assemble the entire modular headliner. If no provision for relative displacement were provided, the vehicle build would have to have precise tolerances on the openings, presently unattainable, or some other method of adjusting the positioning of the modular headliner relative to the vehicle body structure would be necessary. However, with the provision of overlapping holes for allowing for sliding fits between the fastener and the combination of the headliner and the header of the A-pillar inner and the header, a snap-fit relationship is possible.

As may be specifically seen from FIGS. 2 and 3 this various combination acts to allow the fastener 44 to be inserted, such that it may be displaced in the left/right direction as shown in FIG. 3, but not the front/back direction. However, the cover is appropriately sized such that the cover is not retained in the left/right direction by the header opening such that relative to the header, the assembly may be slid in the left/right direction. However, the cover is sized in the front/back direction relative to the header opening such that the cover may not be slid in the front/back direction. Consequently, one opening for each fastener acts to maintain the modular headliner in the desired position at that location. Consequently, variations between the A-pillar inner and the header are accommodated without skewing the entire headliner module.

Figure 4:
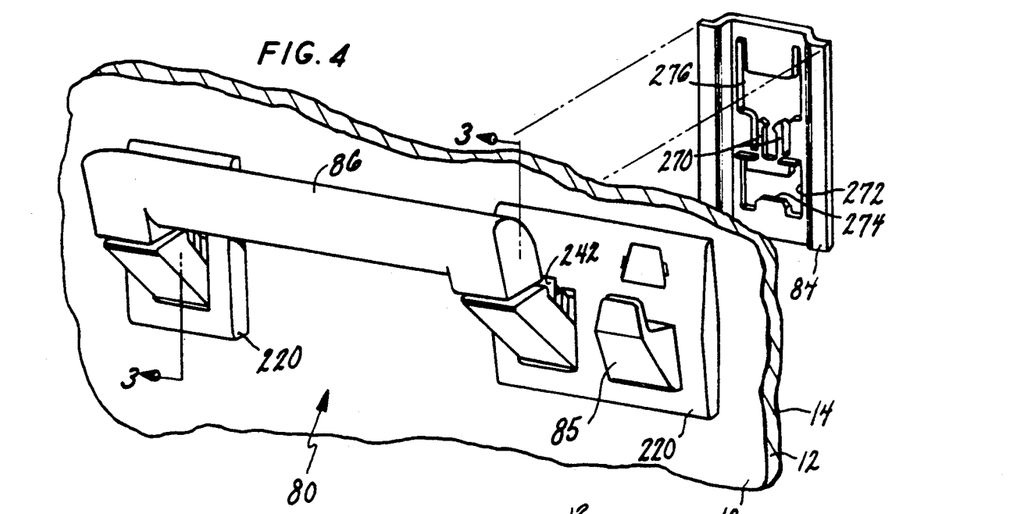
FIG. 4 is a perspective view of an assist strap and retainer.
Figure 5:
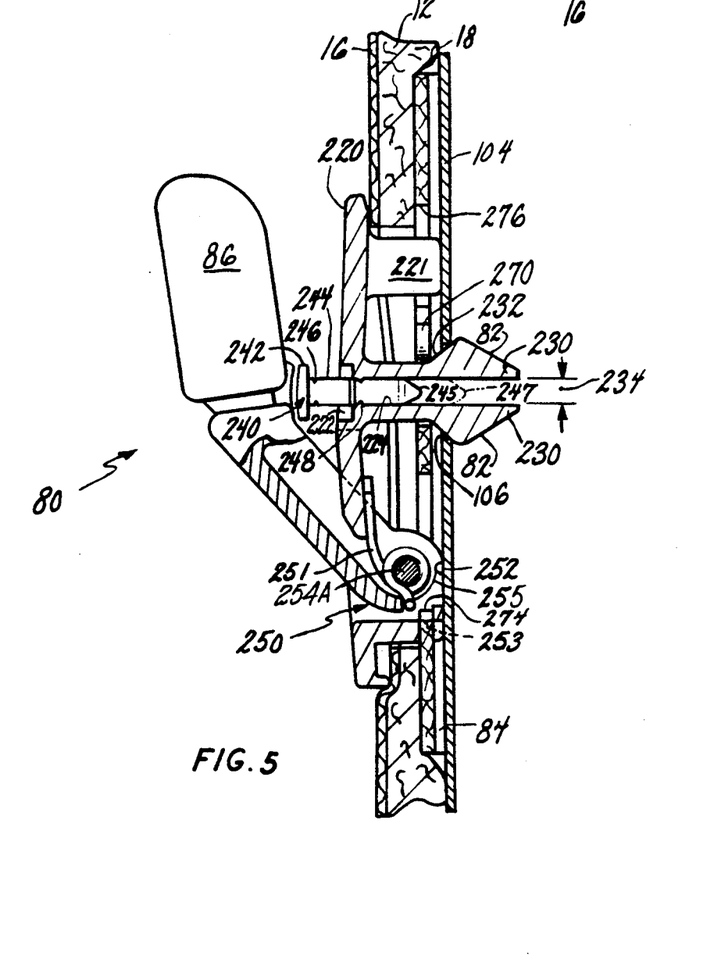
FIG. 5 is a sectional view of an assist strap and a retainer of FIG. 4 taken at the indicated line.
Figure 6:
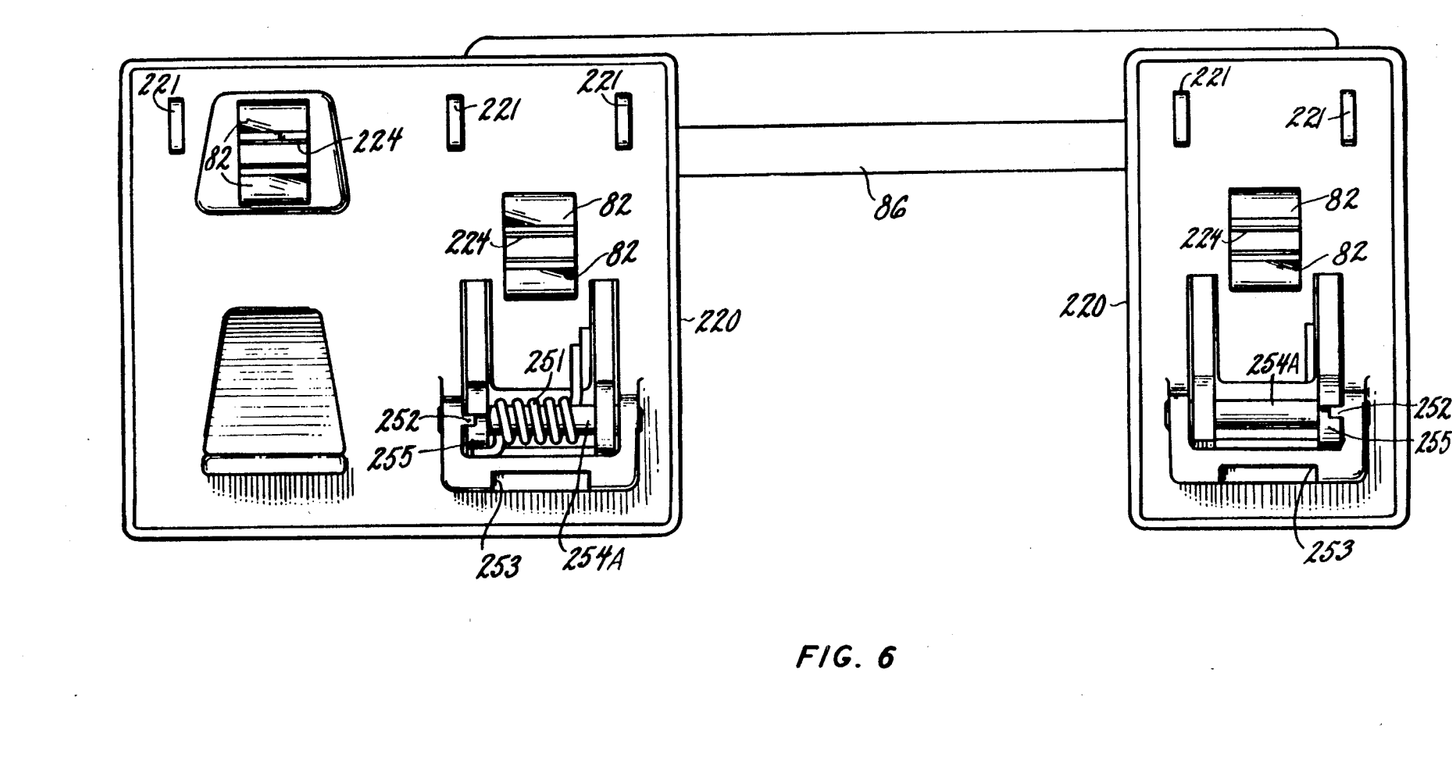
FIG. 6 is a rear view of the assist strap as shown in FIG. 4.

FIGS. 4, 5 and 6 all disclose various portions of an assist strap assembly. FIG. 4 is a perspective view of an assist strap assembly and retainer to be mounted thereto. FIG. 5 is a sectional view of an assist strap assembly showing a mandrel in a first position when it does not secure the legs to the side rail inner and a second position wherein the assist strap is secured to the vehicle body structure by the mandrel locking the legs to the side rail. FIG. 6 is a rear view of the assist strap assembly.

As may be seen in the Figures, base 220 has coat hook 85 and grab handle 86 extending therefrom. The entire arrangement is referred to as an assist strap 80. Base 220 may be divided into two portions as shown or may be a unitary base extending the entire length of the assist strap. The base handle mounting area 250 is that portion to which handle 86 is mounted for pivotal motion. Spring 251 is utilized to bias the handle 250 in the upward direction. Pivot rod 254A extends through the handle and acts to mount the handle for pivotal movement. The handle further includes a notch 254 for receipt of the breakaway tab 252. As can be seen more specifically in FIG. 6, breakaway tab 252 extends from the base to the handle such that the position of the handle is maintained until the breakaway tab is ruptured. The handle may include an inclined surface leading to notch 254 to facilitate assembly of the handle to the base.

Mandrel 240 includes a head 242 and a body 244. The mandrel is shown in first position 245 in solid and in second position 247 with dotted lines. In the first position, the mandrel does not impact the movement of legs 82, however, in the second position, the mandrel occupies leg gap 234 between legs 82 to prevent them from being displaced inwardly.

Legs 82 are appropriately sized and include flared end 230 such that as the assist strap is assembled to the vehicle, the flared ends engage assist strap openings 106 and are forced together or compressed as the assist strap is pushed into position. Once the flared end 230 passes through the opening, the legs expand outwardly and contact surfaces 232 engage side rail inner 104 to maintain the assist strap mounted to the side rail inner. The substrate is shown in the manner which the substrate is secured by the base to the side rail.

As specifically seen in FIG. 5, the mandrel is displaced from the first position to the second position wherein the legs 82 are maintained with the contact surface 232 engaging side rail inner 104. With the mandrel being placed in leg gap 234, the legs may not be compressed, and hence the assist strap may not be removed from the side rail inner.

During the assembly process, the assembler will place the assist strap in position as a portion of the modular headliner assembly or as a separate element if desired and will then cause the legs to pass through the assist strap opening. Once the assembler feels the legs pass through the assist strap opening, he may then decide to drive the mandrel from the first position to the second position. The mandrel may be appropriately displaced by the assembler smacking handle 86 with his hand with sufficient force to drive the mandrel from the first position to the second position.

The handle provides means for tuning the force to assure that the mandrel is driven from the first position to the second position. Breakaway tab 252 extends between notch 254 in the handle to base 220. The size and material of this tab are selected such that the force necessary to rupture the tab is sufficient to force the handle against the mandrel to assure the mandrel moves from the first position to the second position. Hence, as the handle is smacked by the operator, the tab is ruptured and the handle continues to move toward the base driving the mandrel from the first position to the second position.

Base 220 includes a base opening 224 for the mandrel body and base opening 222 for the mandrel head. When the mandrel is moved to the second position, the mandrel head is contained within base opening 222 to provide an assist strap with an overall neat appearance. Additionally, notches 246 of mandrel 240 mate with protuberances 248 to secure the mandrel in the second position. In this manner, the assist strap acts to lock the base and the substrate contained therebetween to the side rail inner to secure the modular headliner or to secure the assist strap to the vehicle body structure. In this position, the base at the handle mounting area and at engagement projections 221 engages side rail inner 104 to provide stability and support to the assist strap.

When the assist strap is part of a modular headliner, it is necessary to secure the assist strap to the substrate prior to assembly of the modular headliner to the vehicle body. To accomplish this, retainer clip 84, a planar member, is mounted to the assist strap behind the substrate such that the substrate is sandwiched between the base and the retainer clip to secure the assist strap to the substrate. The retainer clip includes leg opening 276 through which legs 82 may pass and a handle mounting opening 272 through which the handle mounting area 250 may pass. Spring arms 270 are part of the retainer clip and are designed to engage around legs 82. Tab 274 extends into handle mounted opening 272 and is positioned to engage notch 253 of the mounting area.

Hence, when the assist strap is assembled to the modular headliner substrate, a portion of the assist strap is inserted through the appropriate substrate opening. The retainer is then located with the leg opening over the legs and the handle mounting opening over the handle mounting area. The retainer is then slidably displaced such that spring arms 270 engage around legs 82 and such that tab 274 engages with notch 253. In this manner, the retainer is secured to the assist strap with the substrate sandwiched therebetween to hold the assist strap to the substrate. The retainer is left in position when the modular headliner is mounted to the vehicle body structure.

When the assist strap is utilized other than with a modular headliner, the retainer is not necessary. The assist strap will simply be mounted by inserting the legs through appropriate opening in the substrate, if one is used, and then through the side rail inner or other sheet metal structure of a vehicle body structure. The setting of the mandrel will thereafter be the same.

It is to be noted that the contact surface between handle 86 and mandrel head 242 is smooth such that a sliding action between the two there will occur without any transverse forces being applied. Additionally, the contact area is appropriately designed such the forces applied from the handle to the mandrel are applied along the axis of the mandrel and are not bending forces.

The invention has been described with reference to a particular embodiment. It is to be understood by those skilled in the art that variations and modifications can be made within the spirit and scope of the invention.

We claim:

1. A method of assembling a modular headliner including an assist strap to a vehicle body structure defining vehicle body openings wherein the assist strap includes projecting fastening means and a mandrel mounted therein for slidable displacement to lock the fastening means in position and a pivotally mounted handle, a portion of said handle is in spaced relation to and adjacent said mandrel, the method comprising the steps of:
   positioning the headliner within the vehicle body with the fastening means aligned with the vehicle body openings;
   displacing the headliner until the fastening means snap fits to the vehicle body structure adjacent the vehicle body openings; and
   pivotally moving the handle thereby moving the portion of the handle into contact with the mandrel and continuing to pivotally move the handle while the portion is in contact with the mandrel thereby sliding the mandrel to a position at which it locks the fastening means to the vehicle body structure.

2. The method as set forth in claim 1 and further comprising the steps prior to the step of positioning:
   placing an assist strap including an extending fastening means on the headliner with the fastening means extending through openings in the headliner; and
   retaining the assist strap to the headliner prior to the step of positioning by engaging a retainer to the fastening means to secure the headliner between the assist strap and the retainer.

3. The method as set forth in claim 2 wherein the pivotally mounted handle is secured by at least one breakaway tab and wherein the step of rotating the handle further comprises applying sufficient force to the handle, thereby rupturing the breakaway tab.

4. The method as set forth in claim 3 and further comprising the step of sizing the breakaway tab to tune the force required such that the force required to be applied to the handle to rupture the breakaway tabs is sufficient to displace the mandrel to a position to lock the fastening means.

* * * * *